July 18, 1967 G. S. STARRETT 3,331,152
FISHHOOK GUARD

Filed Oct. 15, 1965 2 Sheets-Sheet 1

INVENTOR.
GEORGE S. STARRETT
BY
Christie, Parker & Hale
ATTORNEYS.

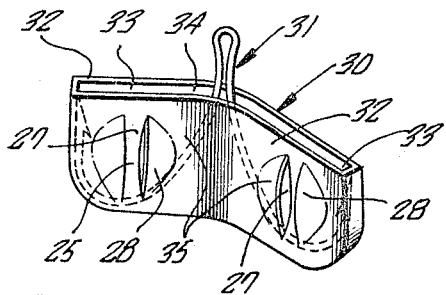
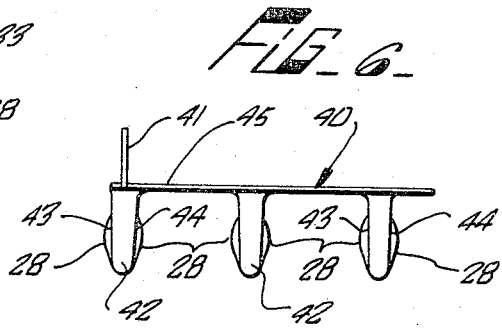
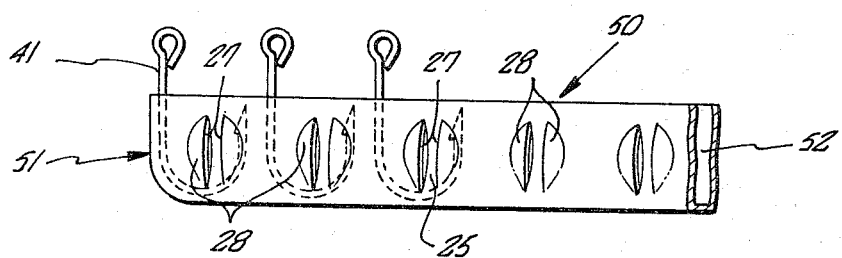
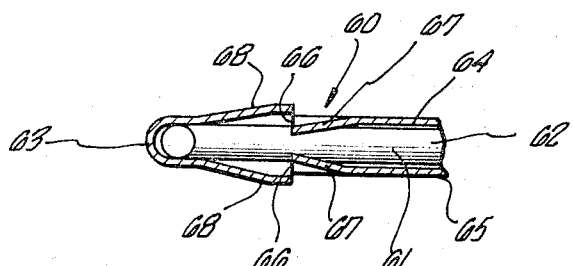

United States Patent Office 3,331,152
Patented July 18, 1967

3,331,152
FISHHOOK GUARD
George S. Starrett, 615 Cliff Drive,
Pasadena, Calif. 91107
Filed Oct. 15, 1965, Ser. No. 496,402
15 Claims. (Cl. 43—57.5)

This invention relates to fishhook guards, and more particularly to a fishhook guard which has the feature that a fishhook is easily insertable into and removable from the guard when desired, but is retained securely in the guard when the guard is in use.

Fishhook guards have been commercially available for some time. The prime function served by such devices is to protect the barb of a fishhook when the fishhook is not in use. If a fishhook guard is to receive favorable acceptance in the market place, it must be inexpensive. Further, it must be durable and both easy and safe to use; it is in the latter respects that presently available fishhook guards are deficient. The presently conventional fishhook guard has the undesirable characteristic that a fishhook is too securely retained therein. The guard is so constructed that a user normally grips the guard in such a way that the gripping pressure of the user's fingers against the guard acts to more firmly retain the fishhook within the guard. A fishhook may be removed easily from this guard only when the user places his fingers close to the path of movement of the barb out of the guard; even then, the release of the fishhook is sudden, and it is very easy for the user to drive the barb into his fingers. The degree of care necessary to avoid this result is rarely exercised by a fisherman when it is desired to replace or exchange hooks or lures as quickly as possible.

This invention provides a novel fishhook guard which lends itself to production by mass production techniques, thereby resulting in an inexpensive product. Moreover, the guard is easily engageable with and disengageable from a fishhook, yet the guard remains engaged with the hook when desired. The guard is so constructed that it is not urged more firmly into engagement with a fishhook when held by a fisherman or the like in the most likely manner, and thus the guard avoids the undesirable characteristics of presently available guards.

Generally speaking, this invention provides a fishhook guard including a thin-walled body fabricated of a material having inherent resiliency. The body defines a receptacle cavity having an open end. The cavity is sized to receive the barb, the curved portion and a portion of the shank of a fishhook. The cavity is defined in part by two opposing walls of the body which are spaced apart a distance at least equal to the thickness of the fishhook. The walls, at opposed locations transversely of the cavity located proximate to and on the concave side of a fishhook received in the cavity, are bowed toward each other to define two detent protuberances curved convex to the interior of the cavity. The convex surfaces of the protuberances are spaced apart a distance less than the thickness of the fishhook. Each protuberance is bounded on at least one side by a slit through the cavity wall so that each protuberance is deformable against the inherent resilient bias of the material from which the body is made to admit the passage of the curved portion of the fishhook past it.

The above-mentioned and other features of the present invention are more fully set forth in the following description of presently preferred guards according to this invention, which description is presented in conjunction with the accompanying drawing, wherein:

FIG. 5 is a perspective view of a guard similar to the guard shown in FIG. 1 for a double fishhook;

FIG. 6 is an elevation view of a guard for a plurality of single-barb fishhooks;

FIG. 7 is an elevation view of another guard for a plurality of single-barb fishhooks; and FIG. 8 is a cross-sectional plan view of another guard according to this invention.

Figure 1:
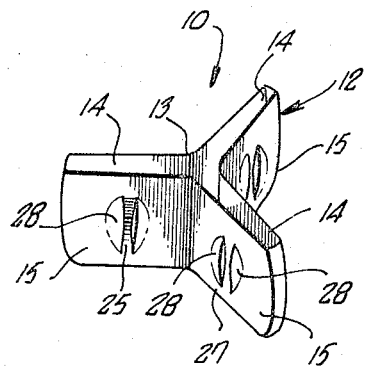
FIG. 1 is a perspective view of a guard for a treble fishhook.

FIG. 1 shows a guard 10 for a treble or three-barb fishhook 11. The guard has a body 12 fabricated of a material which has inherent resiliency. Preferably the body is fabricated of a moldable thermoplastic material. The body defines an upwardly open receptable cavity 13. The cavity has three interconnected branches 14 defined by three legs or sections 15 of the body.

Figure 2:
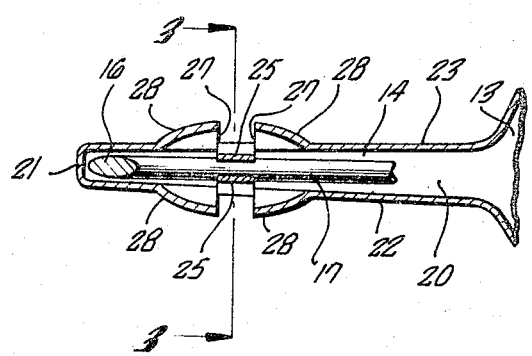
FIG. 2 is a cross-sectional plan view of a portion of the guard shown in FIG. 1 taken along line 2—2 of FIG. 3.
Figure 3:
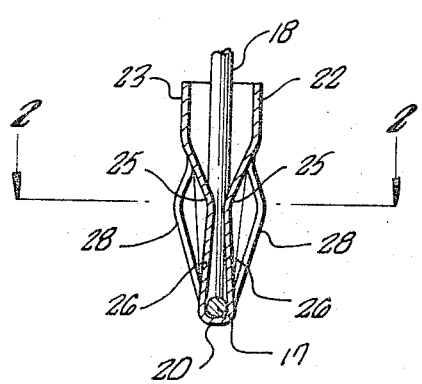
FIG. 3 is a cross-sectional elevation view taken along line 3—3 of FIG. 2.
Figure 4:
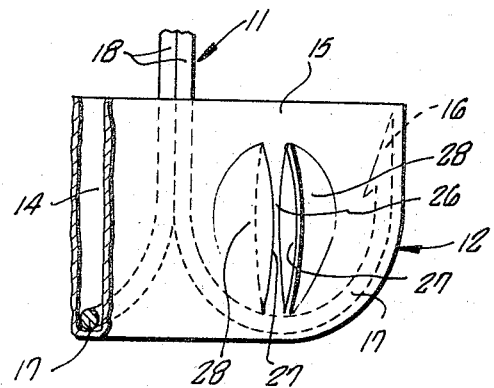
FIG. 4 is a fragmentary elevation view of the guard shown in FIG. 1.

As shown in FIGS. 1, 2 and 3, each branch portion is shaped and sized to receive the barb 16, the curved portion 17, and a portion of the shank 18 of each leg of the treble fishhook. The cavity has a depth greater than the distance from the point of the hook barb to the lowermost point of the curved portion of the fishhook. The shanks of the several barbed hook legs are aligned with and abutted against each other; the shank portion of the fishhook lies over a common intersection of the branches of the cavity. The three legs of a treble fishhook are disposed at angles of 120° relative to each other; the branches of the receptacle cavity are similarly oriented relative to each other about their common intersection.

Each branch of the receptacle cavity has a bottom 20 and an end 21 disposed opposite the common intersection of the cavity branches. The other cavity branch boundaries are defined by two opposing thin walls 22 and 23. The walls are substantially parallel to each other, but diverge slightly from each other proceeding inwardly from end 21 and upwardly from bottom 20, as shown in FIGS. 2 and 3. At the bottom and end of each body section, the opposing surfaces are spaced apart a distance at least as great as the thickness of the fishhook, i.e., a distance at least equal to the diameter of the wire from which the fishhook is made.

At a location close to and above the concave side of the curved portion of each leg of fishhook 11, i.e., above bottom 20 and centrally of the radial length of each body section 15, each wall 22, 23 defines a hook detent protuberance 25 curved convex to the interior of cavity 13 and concave to the exterior of the body. Preferably the detent protuberances are aligned with each other across the cavity branches, as shown in FIG. 2. The convex surfaces of the protuberances are spaced apart from each other a distance less than the thickness of the fishhook. In guard 10, each protuberance resembles a strip 26 of the body wall having opposite ends connected integrally with the body adjacent the cavity top and bottom and bowed inwardly of the cavity along its length. The sides of the strip are defined by a pair of substantially parallel slits 27 through the body, the slits extending parallel to the depth of the cavity from adjacent the bottom of each cavity branch to adjacent the open upper end of the cavity branch.

The fishhook is inserted into the guard merely by aligning the three legs of the fishhook over the three branches of cavity 13 and pushing the fishhook into the cavity. As the fishhook moves into the guard, the curved portions of the treble fishhook engage the convex surfaces of the protuberances and deflect the protuberances laterally against the bias of the protuberances provided by the inherent resiliency of the material from which the guard is made. As the curved portions of the fishhook pass the protuberances, the protuberances return to their normal bowed condition to retain the guard in engagement with the fishhook. The fishhook is readily removed from the guard by a reverse procedure.

When a fisherman desires to remove the guard from a fishhook engaged therein, the simplest way to hold the guard is between the thumb, forefinger, and middle finger of one hand, these fingers being engaged with the body adjacent the common intersections of the cavity branches so that the cavity opens away from the hand. Because the protuberances are concave to the exterior of the body, the fisherman's fingers do not engage the protuberances. Thus, the pressure which the fingers exert upon the guard body is not effective upon the protuberances and the protuberances are free to deflect toward the planes of the respective body walls as the fishhook is pulled out of the guard. Accordingly, the fishhook is easily and safely removed from the guard.

To further assure that a fisherman's finges do not engage and restrict movement of the several pairs of protuberances of guard 10 as the guard is held during removal of a fishhook from the guard, each wall 22, 23 of the guard defines a shield projection 28 which extends convex exteriorly of the body along the side of each slit 27 opposite from the protuberance defined between the slits. Each projection is formed by dishing each wall 22, 23 of the body outwardly of the cavity so that the projection is concave to the interior of the guard. Each projection is generally semi-circular in shape and is bounded along one side by a slit 27.

FIG. 5 shows a guard 30 for a double or two-barb fishhook 31. The guard for the double hook is similar to guard 10, except that one leg 15 of guard 10 is omitted to provide guard 30. Accordingly, guard 30 defines two legs 32 oriented at an angle of 120° relative to each other about the intersection of two branches 33 of a receptacle cavity 34 defined by guard body walls 35.

The walls of the cavity branches in guards 10 and 30 diverge slightly from the ends and bottoms thereof to accommodate multiple barb fishhooks which may have their legs misaligned slightly from the standard 120° separation encountered in such fishhooks. Such misalignment of the legs may result from use of the fishhooks, or it may be present as a result of manufacturing discrepancies.

A guard 40 for a number of single-barb fishhooks 41 is shown in FIG. 6. Guard 40 includes a plurality of hook receptacle pockets 42 having substantially parallel opposing thin walls 43 and 44. Each pocket is substantially identical to a leg 15 of guard 10 modified to have two closed vertical ends interconnecting opposite side edges of the walls. Each wall 43, 44 defines a protuberance 25 (not shown in FIG. 6) disposed between two projections 28 convex to the exterior of each pocket. The pockets are formed integral with an interconnecting web 45; the interior of each pocket opens to the exterior of the guard through the web. The pockets are arranged parallel to each other transversely of the elongate extent of the web and are spaced from each other a distance sufficient that a fisherman may engage the opposite sides of a pocket between his thumb and forefinger to facilitate the removal of a fishhook from the pocket. The guard is fabricated from a material which has inherent resiliency, such as a vacuum moldable thermoplastic material.

Another guard 50 for single-barb fishhooks is shown in FIG. 7. Guard 50 comprises a body 51 defining an elongate receptacle cavity 52 having a depth from an open upper end slightly greater than the distance from the point of the barb of a single-barb fishhook 41 to the extreme lowermost point on the curved portion of the fishhook between the barb and the hook shank. The body has an indeterminant length corresponding to the number of fishhooks which the guard is designed to accommodate. The body is fabricated of a material having inherent resiliency and defines two substantially vertical opposing thin walls 53 and 54. The walls define the opposite sides of the receptacle cavity and are spaced apart from each other a distance at least as great as the thickness of a fishhook 41. At selected opposed locations spaced from each other along the length of the guard, the walls define the protuberance 25 and projection 28 combinations described above. The utility and operation of the guard is readily apparent from the foregoing description.

FIG. 8 shows another guard 60 defining a receptacle cavity 61 having a bottom 62, a closed end 63, and substantially parallel thin side walls 64 and 65. The guard is fabricated of a material having inherent resiliency. The inner surfaces of the walls are spaced apart from each other a distance at least as great as the thickness of a fishhook engaged in the cavity. In substantially the same location of the guard relative to a fishhook disposed therein as the location of protuberance 25 relative to a fishhook engaged in guard 10, each wall 64, 65 of guard 60 defines a slit 66 through its extent. The slit is aligned parallel to the depth of the cavity. Preferably the slits are aligned with each other transversely of cavity 61. Along one side of the slit, each wall is dished or bowed inwardly toward the other wall to define a hook detent protuberance 67 curved convex to the cavity and concave to the exterior of the guard. It is preferred that the protuberances be disposed directly opposite each other across the cavity as shown in FIG. 8, but it is within the scope of this invention that the protuberances be defined on opposite sides of the slits, if desired. The convex surfaces of the protuberances are spaced from each other a distance less than the thickness of a fishhook engaged in the cavity. The protuberances cooperate to admit the passage of a fishhook into and out of the cavity, and to retain a fishhook in the cavity, in the same manner that protuberances 25 perform these functions.

To assure that a fisherman's fingers may not engage the concave sides of the protuberances as a fishhook is removed from the guard, thereby hindering the deflection of the protuberances against the resilient bias of the material from which the body is made, each wall defines a shield projection 68 on the side of slit 66 opposite from protuberance 67. Each shield projection is formed integral with the body wall by dishing the wall convex outwardly of the cavity along the slit. The projections and the protuberances have complementary semi-circular configurations in the planes of the walls in which they are formed.

It will be readily apparent that protuberance 67 and projection 68 combinations may be used in guards 10, 30, 40 and 50 in lieu of protuberances 25 and projections 28 without departing from the scope of this invention. It is also apparent that the guards described above are constructed for a particular size of fishhook, and that the size of the guards may be varied to accommodate different sizes of fishhooks without departing from the scope of the invention. Accordingly, the foregoing description is not to be regarded as limiting the scope of the invention since it has been presented merely by way of explanation and example with reference to presently preferred guards according to the invention.

What is claimed is:

1. A fishhook guard comprising a body fabricated of a material having inherent resiliency, the body defining an open ended receptacle cavity sized to receive therein the barb portion of a fishhook, the curved portion of the fishhook and a portion of the fishhook shank, the cavity being defined in part by two opposing walls of the body spaced apart a distance at least equal to the thickness of the fishhook, the walls at substantially opposed locations transversely of the cavity defining a portion bowed toward the other wall to define a detent protuberance convex to the interior of the cavity, said locations being disposed proximate to and on the concave side of the curved portion of a fishhook received in the cavity, the convex surfaces of the detent proturberances being spaced from each other a distance less than the thickness of the fishhook, each detent protuberance being bounded on at least one side thereof by a slit through the adjacent wall so that the detent protuberances is deformable against the inherent resilient bias of said material toward the adjacent wall to admit the passage of the curved portion of the fishhook therepast.

2. A fishhook guard according to claim 1 wherein each detent protuberance comprises a strip-like portion of the adjacent body wall defined between a pair of slits through said wall and joined at its opposite ends to said wall.

3. A fishhook guard according to claim 2 wherein each wall adjacent one of said pair of slits and on the side of said one slit opposite from the strip-like portion defines a projection convex to the exterior of the body.

4. A fishhook guard according to claim 3 wherein the projection is defined by a portion of the body wall adjacent the strip-like portion and bounded by said one slit being bowed locally of the wall away from the cavity to define a surface concave to the cavity and a surface convex to the exterior of the body.

5. A fishhook guard according to claim 2 wherein each wall adjacent each slit of said pair of slits and opposite from the strip-like portion defines a projection convex to the exterior of the body.

6. A fishhook guard according to claim 5 wherein each projection on each wall is defined by a portion of said wall adjacent a respective slit and bounded thereby being bowed locally of the wall away from the cavity to define a surface concave to the cavity and a surface convex to the exterior of the body.

7. A fishhook guard according to claim 2 wherein the strip-like portions of the walls are aligned with each other across the cavity.

8. A fishhook guard according to claim 1 wherein each detent protuberance is defined by a portion of the adjacent wall adjacent to and bounded by said slit being bowed locally of the wall toward the cavity.

9. A fishhook guard according to claim 8 wherein each wall adjacent the slit therethrough and opposite from the detent protuberance defines a projection convex to the exterior of the body.

10. A fishhook guard according to claim 9 wherein each projection is defined by the portion of the wall opposite the slit from the protuberance and bounded by the slit being bowed away from the cavity.

11. A fishhook guard according to claim 1 for a treble fishhook wherein the receptacle cavity has three mutually communicating branches disposed at substantially 120° to each other, each of said cavity branches being bounded in part by a pair of said opposing walls defining said detent protuberances.

12. A fishhook guard according to claim 11 wherein each cavity branch has a bottom extending between said opposing side walls and an end spaced from the common intersection of said cavity branches and extending between said opposing side walls of said branch, said opposing walls diverging slightly from each other proceeding from said bottom to the open end of the cavity and from said end toward the common intersection of the cavity branches.

13. A fishhook guard according to claim 1 for a double fishhook wherein the receptacle cavity has two vertically oriented branches intersecting each other at an angle of about 120°, each of said cavity branches being bounded in part by a pair of said opposing walls defining said detent protuberances.

14. A fishhook guard according to claim 1 for a plurality of single-barb fishhooks of selected size consisting of a single elongated cavity bounded in part by said opposing walls, the cavity having a depth from the open end thereof at least as great as the distance between the barb point and the lowermost point of the curved portion of a fishhook of said selected size, each wall defining a corresponding plurality of detent protuberances, said protuberances being spaced apart from each other along the length of each wall, each protuberance defined by one wall being substantially aligned with a corresponding protuberance defined by the other wall.

15. A fishhook guard according to claim 1 for a plurality of single-barb fishhooks including a corresponding plurality of pairs of said opposing walls defining a corresponding plurality of said receptacle cavities, the pairs of walls each depending from an elongate web member extending between the open ends of adjacent cavities and being spaced from each other along the extent of the web member.

References Cited
UNITED STATES PATENTS

| | | | |
|---|---|---|---|
| 1,255,516 | 2/1918 | Daller | 43—57.5 |
| 2,616,209 | 11/1952 | Ploen | 43—57.5 |
| 2,703,467 | 3/1955 | Shepherd | 43—57.5 |
| 2,723,485 | 11/1955 | Pederson | 43—57.5 |

SAMUEL KOREN, *Primary Examiner.*

HUGH R. CHAMBLEE, *Examiner.*